(12) United States Patent
Hagihara (10) Patent No.: US 9,030,588 B2
(45) Date of Patent: May 12, 2015

(54) IMAGING APPARATUS FOR REDUCING DETERIORATION OF AD CONVERSION OF A PIXEL SIGNAL

(71) Applicant: Olympus Corporation, Tokyo (JP)

(72) Inventor: Yoshio Hagihara, Tokyo (JP)

(73) Assignee: Olympus Corporation, Tokyo (JP)

( * ) Notice: Subject to any disclaimer, the term of this patent is extended or adjusted under 35 U.S.C. 154(b) by 37 days.

(21) Appl. No.: 13/953,272

(22) Filed: Jul. 29, 2013

(65) Prior Publication Data

US 2014/0036125 A1   Feb. 6, 2014

(30) Foreign Application Priority Data

Aug. 6, 2012 (JP) ................. 2012-174035

(51) Int. Cl.
*H04N 5/335* (2011.01)
*H04N 5/3745* (2011.01)
*H04N 5/378* (2011.01)

(52) U.S. Cl.
CPC .......... *H04N 5/37455* (2013.01); *H04N 5/378* (2013.01)

(58) Field of Classification Search
CPC .......... H03M 1/56; H03M 1/14; H03M 1/34; H04N 5/378; H04N 2201/04758; H04N 2201/04724; H04N 2201/04734; H04N 5/3745; H04N 5/37455; G04F 10/005; H01L 27/14609

USPC .............. 348/222.1, 294, 295, 297, 302, 308, 348/364

See application file for complete search history.

(56) References Cited

U.S. PATENT DOCUMENTS 8,405,749 B2 * 3/2013 Suzuki ................. 348/302
8,530,816 B2 * 9/2013 Kume .................. 250/208.1

FOREIGN PATENT DOCUMENTS

| JP | 2008-092091 A | 4/2008 |
| JP | 2009-038726 A | 2/2009 |
| JP | 2012-039386 A | 2/2012 |

* cited by examiner

*Primary Examiner* — James Hannett
*Assistant Examiner* — Padma Haliyur
(74) *Attorney, Agent, or Firm* — Westerman, Hattori, Daniels & Adrian, LLP (57) ABSTRACT

An imaging apparatus capable of reducing deterioration of AD conversion accuracy is provided, wherein, when performing the AD conversion on a pixel signal corresponding to a reset level, a latch control unit causes a latch circuit of a latch unit to enter an enabled state (third timing) at a first timing according to a comparison start in a comparing unit, and then causes the latch circuit of the latch unit to execute latching at a fourth timing at which a predetermined time has lapsed from a second timing according to a comparison end in the comparing unit. Further, when performing the AD conversion on the pixel signal corresponding to the signal level, the latch control unit causes the latch circuit of the latch unit to enter the enabled state at the second timing according to the comparison end in the comparing unit.

2 Claims, 7 Drawing Sheets

FIG. 7   PRIOR ART

IMAGING APPARATUS FOR REDUCING DETERIORATION OF AD CONVERSION OF A PIXEL SIGNAL

BACKGROUND OF THE INVENTION

1. Field of the Invention

This invention relates to an imaging apparatus.

Priority is claimed on Japanese Patent Application No. 2012-174035, filed Aug. 6, 2012, the content of which is incorporated herein by reference.

2. Description of Related Art

As one example of an imaging apparatus using a time to digital converter (TDC) type of Analog to Digital (AD) conversion circuit, a configuration described in Japanese Unexamined Patent Application, First Publication No. 2008-92091 and Japanese Unexamined Patent Application, First Publication No. 2009-38726 have been known.

Figure 5:
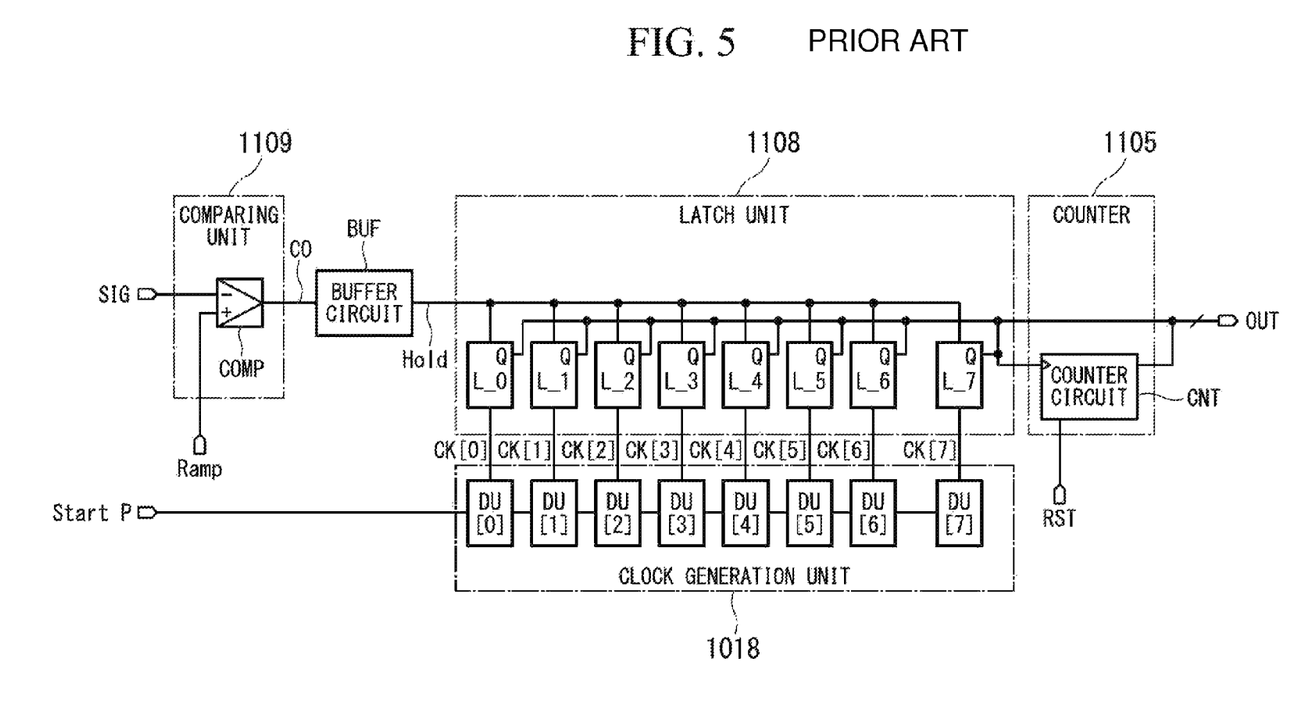
FIG. 5 is a circuit diagram illustrating a part of a configuration of a conventional TDC type of AD conversion circuit.

FIG. 5 shows a part excerpted from the configuration of the TDC type of AD conversion circuit according to a conventional example. First, the configuration and operation of a circuit of FIG. 5 will be described.

The circuit illustrated in FIG. 5 includes a clock generation unit 1018, a comparing unit 1109, a latch unit 1108, a counter 1105 and a buffer circuit BUF. The clock generation unit 1018 has a plurality of delay units DU[0] to DU[7] which delay and output an input signal. A start pulse (=StartP) is input to the leading delay unit DU[0]. The comparing unit 1109 has a voltage comparator COMP which receives an analog signal SIG which is a target of AD conversion and a ramp wave Ramp which decreases with lapse of time, and outputs a comparison output CO based on the result of comparison of the analog signal SIG with the ramp wave Ramp. The latch unit 1108 has latch circuits L__0 to L__7 which latch logic states of output clocks CK[0] to CK[7] from the clock generation unit 1018. The counter 1105 has a counter circuit CNT which performs counting based on the output clock CK[7] from the clock generation unit 1018. A control signal RST is a signal for performing a reset operation of the counter circuit CNT.

In the comparing unit 1109, a time interval (a magnitude of the time axis direction) corresponding to the amplitude of the analog signal SIG is generated. The buffer circuit BUF is an inversion buffer circuit which inverts and outputs the input signal. Here, in order for the description to be readily understood the specification, the buffer circuit BUF is configured of an inversion buffer circuit.

The latch circuits L__0 to L__7 constituting the latch unit 1108 are in an enable (valid, active) state when an output signal Hold of the buffer circuit BUF is in a high state (H state), and the output clocks CK[0] to CK[7] from the delay units DU[0] to DU[7] are output as is. Further, the latch circuits L__0 to L__7 are in a disabled (invalid, hold) state when the output signal Hold of the buffer circuit BUF transitions from a high state (H state) to a low state (L state), and at this time, latch the logic states corresponding to the output clocks CK[0] to CK[7] from the delay units DU[0] to DU[7].

Figure 6:
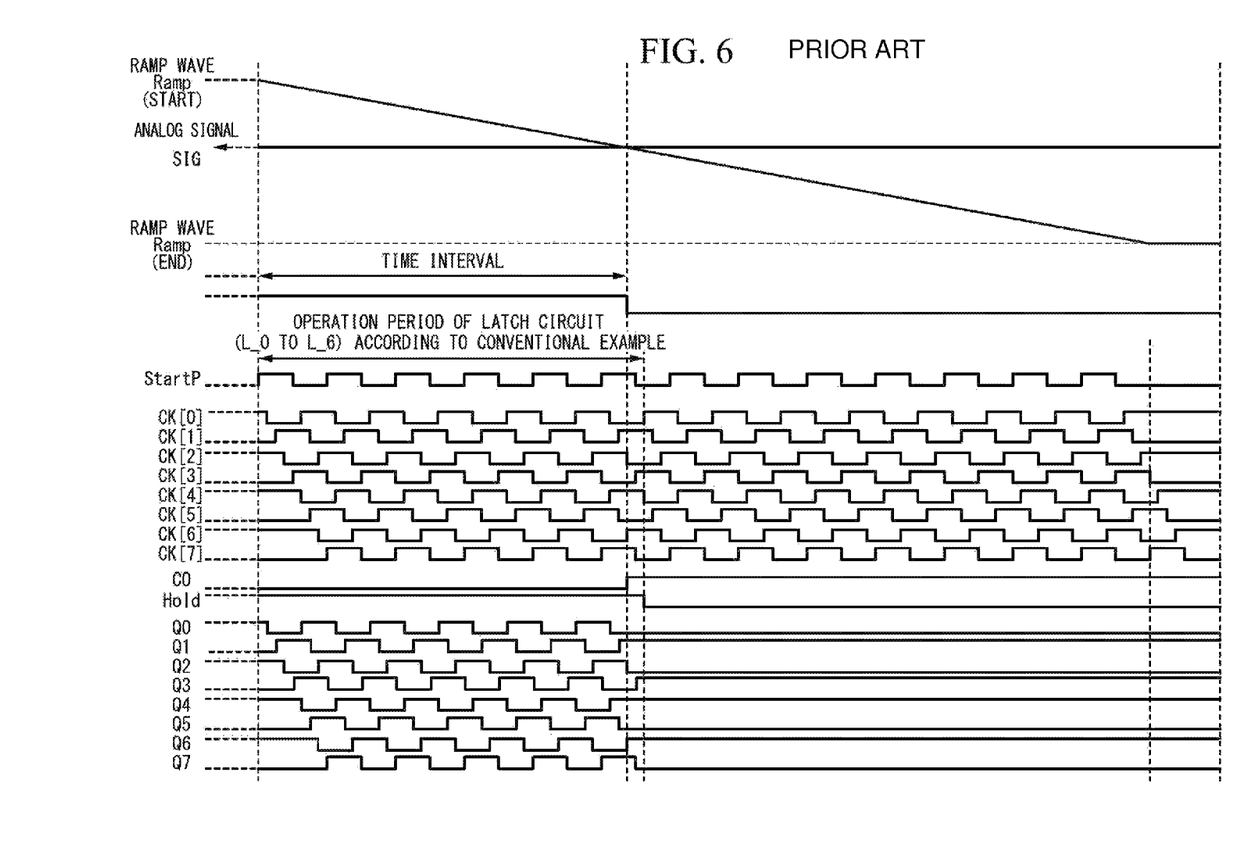
FIG. 6 is a timing chart illustrating an operation of the conventional TDC type of AD conversion circuit.

Next, the operation of the conventional example will be described. FIG. 6 illustrates the operation of a conventional example. In FIG. 6, Q0 to Q7 indicate signals output from the latch circuits L__0 to L__7 of the latch unit 1108.

First, at a timing according to the comparison start of the comparing unit 1109, as a start pulse (=StartP), a clock having a period approximately equal to a delay time of the clock generation unit 1018 is input to the clock generation unit 1018. Thereby, the delay units DU[0] to DU[7] of the clock generation unit 1018 start operations. The delay unit DU[0] inverts and delays the start pulse (=Startp) and output the inverted and delayed start pulse as the output clock CK[0], and the delay units DU[1] to DU[7] respectively invert and delay the output clocks from the delay units in the previous stages to output the inverted and delayed output clocks as the output clocks CK[1] to CK[7]. The output clocks CK[0] to CK[7] from the delay units DU[0] to DU[7] are input to the latch circuits L__0 to L__7 of the latch unit 1108. Since the output signal Hold of the buffer circuit BUF is in an H state, the latch circuits L__0 to L__7 are in an enabled state and output the output clocks CK[0] to CK[7] from the delay units DU[0] to DU[7], respectively.

The counter 1105 performs a counting operation based on the output clock CK[7] output from the latch circuit L__7 of the latch unit 1108. In this counting operation, a count value increases or decreases along with rising or falling of the output clock CK[7]. At a timing at which the analog signal SIG and the ramp wave Ramp are approximately equal, the comparison output CO is inverted. After the comparison output CO is buffered in the buffer circuit BUF, the output signal Hold of the buffer circuit BUF is in an L state.

Thereby, the latch circuits L__0 to L__7 enter a disabled state. At this time, the logic states corresponding to the output clocks CK[0] to CK[7] from the delay units DU[0] to DU[7] are latched in the latch circuits L__0 to L__7. The counter 1105 latches a count value when the latch circuit L__7 stops its operation. The data corresponding to the analog signal SIG can be obtained by the logic state latched by the latch unit 1108 and the count value latched by the counter 1105.

In Japanese Unexamined Patent Application, First Publication No. 2012-39386, realization of low current consumption of the TDC type of AD conversion circuit has been proposed in which a latch control unit which controls the operation of the latch unit 1108 is installed, the analog signal SIG and the ramp wave Ramp approximately coincide, the latch unit 1108 is in an enabled state at a timing (comparison end timing) at which the comparison output CO is inverted, and the latch unit 1108 is in the disabled state at a timing at which a predetermined time has lapsed from the comparison end timing.

Figure 7:
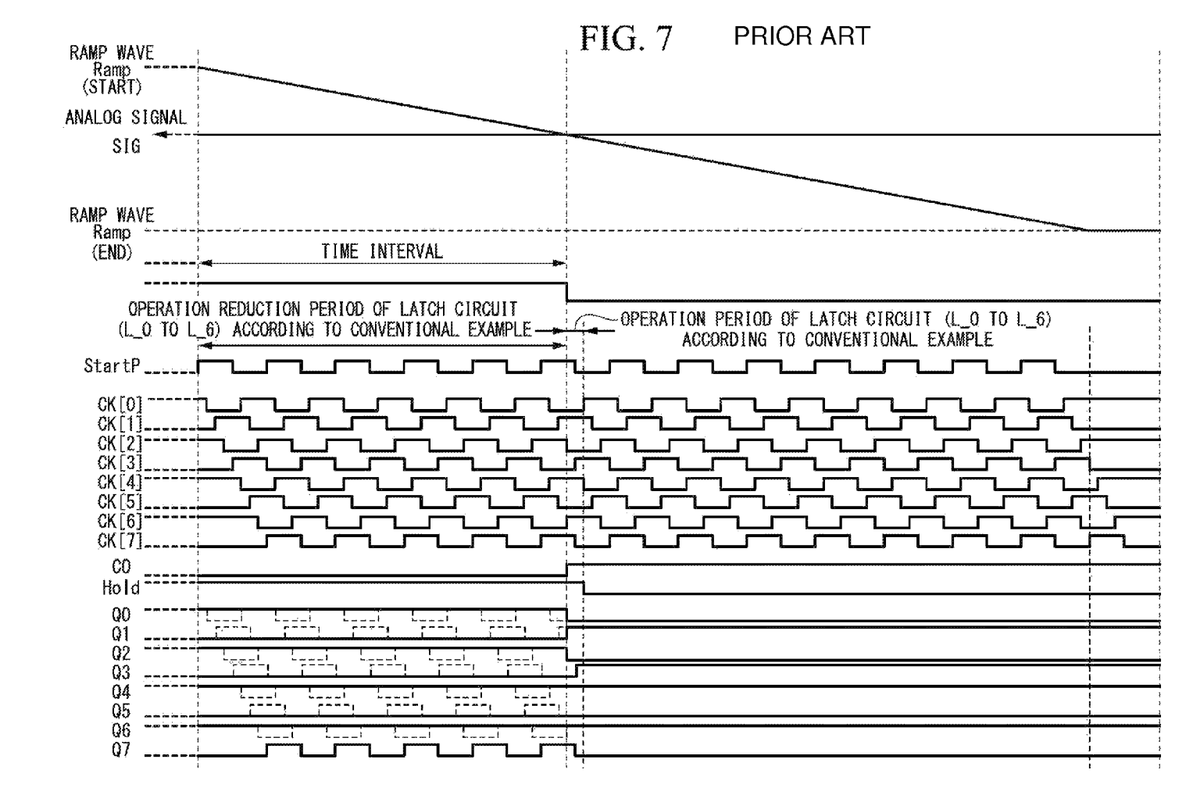
FIG. 7 is a timing chart illustrating the operation of the conventional TDC type of AD conversion circuit.

FIG. 7 illustrates an operation described in Japanese Patent Application, First Publication No. 2012-39386. In FIG. 7, the latch circuits L__0 to L__6 stop operations until the comparison end timing at which the comparison output CO is inverted. The latch circuits L__0 to L__6 enter an enabled state at the comparison end timing. Subsequently, the latch circuits L__0 to L__7 enter a disabled state at a timing at which a predetermined time has lapsed from the comparison end timing. In the above operation, since the latch circuits L__0 to L__6 operate during only the time period until a predetermined time has lapsed from the comparison end timing, it is possible to reduce the consumption current.

SUMMARY OF THE INVENTION

According to a first aspect of the present invention, an imaging apparatus includes an imaging unit in which a plurality of pixels having a photoelectric conversion element are arranged, the imaging unit outputting a first pixel signal corresponding to a reset level and a second pixel signal corresponding to an amount of an incident electromagnetic wave; and an AD conversion circuit configured to perform an Analog-to-Digital-conversion on the first pixel signal and the second pixel signal, wherein the AD conversion circuit includes: a reference signal generation unit configured to generate a reference signal which increases or decreases with lapse of time; a comparing unit configured to start a comparison process of the pixel signal and the reference signal at a first timing for inputting the pixel signal that is a target of AD conversion, the comparing unit ending the comparison process at a second timing at which the reference signal satisfies a predetermined condition for the pixel signal; a clock generation unit which has a delay circuit configured by connecting a plurality of delay units, the clock generation unit outputting a clock signal from each of the delay units; a latch unit configured to latch a logic state of the clock signal output from the clock generation unit; a counter configured to perform a counting based on the clock signal output from the clock generation unit; and a latch controller configured to cause the latch unit to be valid at a third timing before the second timing and to cause the latch unit to execute a latching at a fourth timing when the first pixel signal is AD-converted, the third timing being included in a period from the first timing to the second timing, the fourth timing being a timing when a predetermined time has lapsed from the second timing, the latch controller causing the latch unit to be valid at the second timing and causing the latch unit to execute the latching at the fourth timing when the second pixel signal is AD-converted.

According to a second aspect of the present invention, in the imaging apparatus of the first aspect, the comparing unit, the latch unit, the counter and the latch controller are provided in each column or a plurality of columns of an arrangement of the pixels of the imaging unit.

DETAILED DESCRIPTION OF THE INVENTION

Figure 1:
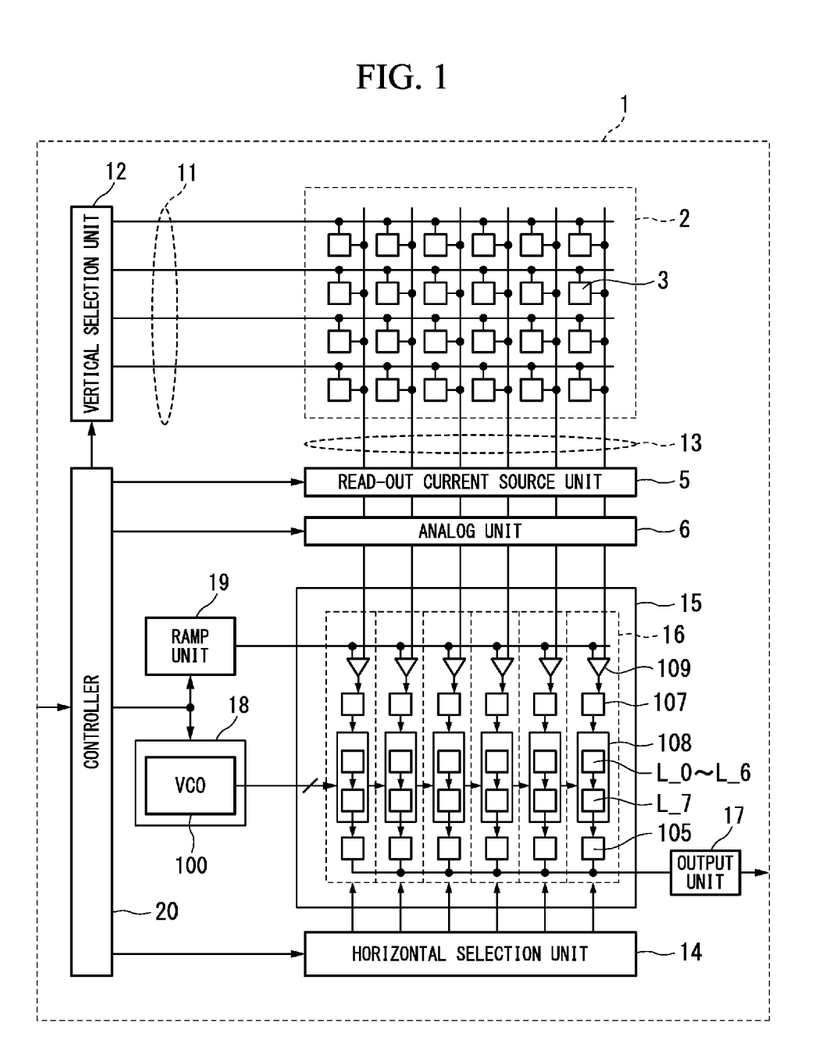
FIG. 1 is a block diagram illustrating a configuration of an imaging apparatus according to one embodiment of the present invention.

Hereinafter, an embodiment of the present invention will be described with reference to the drawings. FIG. 1 shows one example of a configuration of an imaging apparatus according to the present embodiment. An imaging apparatus 1 illustrated in FIG. 1 is configured of an imaging unit 2, a vertical selection unit 12, a read-out current source unit 5, an analog unit 6, a clock generation unit 18, a ramp unit 19 (reference signal generation unit), a column processing unit 15, a horizontal selection unit 14, an output unit 17 and a controller 20.

In the imaging unit 2, a plurality of unit pixels 3 which generate and output signals corresponding to the amount of an incident electromagnetic wave are arranged in a matrix pattern. The vertical selection unit 12 selects each row of the imaging unit 2. The read-out current source unit 5 reads out a signal from the imaging unit 2 as a voltage signal. The analog unit 6 performs an analog signal process on the pixel signal read out from the imaging unit 2. The clock generation unit 18 generates and outputs a clock signal having a predetermined frequency. The ramp unit 19 generates a reference signal (ramp wave) which increases or decreases with lapse of time. The column processing unit 15 is connected to the ramp unit 19 via a reference signal line. The horizontal selection unit 14 reads out Analog-to-Digital-converted data to a horizontal signal line. The output unit 17 is connected to the horizontal signal line. The controller 20 controls each unit.

In FIG. 1, for simplicity, a case in which the imaging unit 2 includes the unit pixel 3 having 4 rows×6 columns will be described, but in practice, in each row and each column of the imaging unit 2, several tens to several tens of thousands of the unit pixels 3 are arranged. Although not illustrated in the drawing, the unit pixel 3 constituting the imaging unit 2 includes a photoelectric inversion element such as a photo diode/photo gate/photo transistor, and a transistor circuit.

Hereinafter, a more detailed description of each unit will be made. In the imaging unit 2, the unit pixel 3 is 2-dimensionally arranged only in an arrangement of 4 rows and 6 columns and the row control line 11 is wired for each row with respect to the pixel arrangement of 4 rows and 6 columns. Each one end of the row control line 11 is connected to each output end corresponding to each row of the vertical selection unit 12. The vertical selection unit 12 includes a shift register, a decoder or the like and performs control on row address and row scan of the imaging unit 2 through the row control line 11 when driving the unit pixel 3 of the imaging unit 2. Further, a vertical signal line 13 is wired for each column with respect to the pixel arrangement of the imaging unit 2.

The read-out current source unit 5 includes an NMOS transistor, for example. The vertical signal line 13 from the imaging unit 2 is connected to a drain terminal of the NMOS transistor which constitutes the read-out current source unit 5, a suitable desired voltage is applied to a gate terminal, and a source terminal is connected to GND. Thereby, a signal from the unit pixel 3 is output as a voltage mode. Although a case of using the NMOS transistor as a current source has been described, the current source is not limited thereto.

Although a detailed description of the analog unit 6 is omitted, the analog unit 6 may have an auto gain control (AGC) circuit having a signal amplification function if necessary.

The column processing unit 15 has a column AD conversion unit 16 installed for, for example, each pixel column of the imaging unit 2, that is, each vertical signal line 13, and converts the analog pixel signal read out through the vertical signal line 13 for each pixel column from each unit pixel 3 of the imaging unit 2 into the digital data. This example takes a configuration of arranging the column AD conversion unit 16 having a one-to-one correspondence relationship for the pixel column of the imaging unit 2, but this is merely one example and is not limited to this arrangement relationship. For example, it is also possible to use a configuration in which one column AD conversion unit 16 is arranged for a plurality of pixel columns and the one column AD conversion unit 16 is used among the plurality of pixel columns in a time division. The column processing unit 15 constitutes an analog-digital conversion means (AD conversion circuit) which converts the analog pixel signal read out from the unit pixel 3 of a selected pixel row of the imaging unit 2 into the digital pixel signal, along with the ramp unit 19 and the clock generation unit 18 which will be described later.

The ramp unit 19 includes an integration circuit, for example, and in response to control by the controller 20, generates a so-called ramp wave in which a level changes in a slope shape with lapse of time and supplies the ramp wave to one side of an input terminal of a comparing unit 109 through the reference signal line. The ramp unit 19 is not limited to the unit using the integration circuit and a DAC circuit may be used. However, if a configuration digitally generating the ramp wave using the DAC circuit is adopted, it is necessary to take fine steps or the equivalent configuration thereto with respect to the ramp wave.

The horizontal selection unit 14 includes the shift register, a decoder or the like, and performs control on the address and column scan of the column AD conversion unit 16 of the column processing unit 15. According to the control of the horizontal selection unit 14, the digital data AD-converted by the column AD conversion unit 16 is sequentially read out to the horizontal signal line.

The clock generation unit 18 includes the VCO100 to which a plurality of delay units (inversion elements) are connected, and outputs the clock signals each having a constant phase difference from each delay unit. In the present embodiment, as one example, the VCO100 has the delay units DU[0] to DU[7] illustrated in FIG. 5, and outputs the output clocks CK[0] to CK[7] as a clock signal. The VCO100 may be a circular ring delay circuit to which the plurality of delay units are connected in a circular ring shape. However, as in the symmetric oscillation circuit, the ring delay circuit itself is configured by odd number of delay units and an asymmetric oscillation circuit in which the outputs are equivalently even (particularly, power-of-two) may be used. Alternatively, the VCO100 includes an even number (specifically, a power of 2) of the delay units, and a so-called "full differential type of oscillation circuit" configured such that the output of the final stage of the full differential type of inversion circuit which constitutes the delay unit is fed back to the other input of the first stage may be used.

The output unit 17 outputs binarized digital data. Further, the output unit 17 may be built-in a signal processing function such as, for example, black level adjustment, column variation correction and color processing in addition to the buffering function. Further, a configuration of converting n bits of parallel digital data into serial data and outputting the converted serial data may be adopted.

The controller 20 is provided with a function block of a timing generator (TG) supplying the pulse signal having a clock and a predetermined timing necessary for operating each unit such as the ramp unit 19, the clock generation unit 18, the vertical selection unit 12, the horizontal selection unit 14 and the output unit 17, and a function block which is used to perform communication with the TG.

Next, a configuration of the column AD conversion unit 16 will be described. The respective column AD conversion unit 16 generates the pulse signal having a magnitude (pulse width) of a time axis direction corresponding to a magnitude of the pixel signal by comparing the analog pixel signal which is read out through the vertical signal line 13 from each unit pixel 3 of the imaging unit 2 with the ramp wave, for performing the AD conversion, which is supplied from the ramp unit 19. Then, the column AD conversion unit 16 performs the AD conversion by converting the data corresponding to a period of the pulse width of the pulse signal into the digital data corresponding to the magnitude of the pixel signal.

Hereinafter, the detail of the configuration of the column AD conversion unit 16 will be described. The column AD conversion unit 16 is installed for each column, and in FIG. 1, six column AD conversion units 16 are arranged. The column AD conversion unit 16 of each column has the same configuration. The column AD conversion unit 16 includes a comparing unit 109, a latch unit 108, a latch controller 107 and a counter 105 (counting unit).

The comparing unit 109 compares a signal voltage corresponding to an analog pixel signal which is output through the vertical signal line 13 from the unit pixel 3 of the imaging unit 2 with the ramp voltage of the ramp wave supplied from the ramp unit 19, thereby converting the magnitude of the pixel signal into information (pulse width of the pulse signal) of the time axis direction. For example, the comparison output CO of the comparing unit 109 becomes a Low level (L level) when the ramp voltage is higher than signal voltage, and becomes a High level (H level) when the ramp voltage is equal to or lower than signal voltage.

The latch unit 108 includes the latch circuits L_0 to L_7 which latches (holds/stores) the logic states of the output clocks CK[0] to CK[7] output from the VCO100. Encoding is performed in the output unit 17 based on the logic states of the output clocks CK[0] to CK[7] latched by the latch unit 108 to obtain data (lower data) of the lower bit forming digital data.

The latch controller 107 generates the control signal used to control the operation of the latch unit 108. The counter 105 performs counting based on the output clock CK[7] from the VCO100. By performing the counting by the counter 105, the higher bit data (higher data) forming digital data is obtained.

Here, the signal corresponding to the logic states of the output clocks CK[0] to CK[7] latched in the latch unit 108 is for example, 8-bits data. Further, the higher data signal formed by the counted value of the counter 105 is 10-bits data, for example. The 10 bits are merely an example, and the bit number may be fewer than 10 (for example, 8 bits), more than 10 (for example, 12 bits) and the like.

Next, the operation of this example will be described. In this case, a description of a specific operation of the unit pixel 3 will be omitted, but in the unit pixel 3, it is well known that the reset level and the signal level are output.

The AD conversion is performed as follows. For example, each voltage of the ramp wave lowering with the predetermined slope and the analog signal from the analog unit 6 is compared, and a length of a period from a time point (a first timing) at which the comparison process is started, to a time point at which the voltage of the analog signal and the voltage of the ramp wave (ramp voltage) coincide (second timing) with each other and a time point (fourth timing) at which the further predetermined time is lapsed is measured by the counted value of the counter 105 and an encode value of the logic states of the output clocks CK[0] to CK[7] latched to the latch unit 108, thereby obtaining digital data corresponding to the magnitude of an analog signal.

In the present embodiment, the AD conversion described above is performed on each of the reset level and the signal level read out from the unit pixel 3. More specifically, the reset level including noise of the pixel signal is read out from each unit pixel 3 of the selected row of the imaging unit 2 by the read-out operation of the first time to perform the AD conversion, and subsequently, a signal level corresponding to the amount of the electromagnetic wave incident on the unit pixel 3 is read out by the read-out operation a second time to perform the AD conversion. Thereafter, by digitally performing a subtraction (CDS process) of the reset level and the signal level, the digital data corresponding to the signal component is obtained. The signal level may be read out in the read-out operation of the first time to perform the AD conversion, and then the reset level may be read out in the read-out operation of the second time to perform the AD conversion.

<<AD Conversion Operation>>
<<Read-Out of First Time>>

After the pixel signal which is output from the unit pixel 3 of an arbitrary pixel row to the vertical signal line 13 and corresponds to the reset level is stabilized, the controller 20 supplies data for controlling generation of the ramp wave for the ramp unit 19. After receiving the control data, the ramp unit 19 outputs a ramp wave in which a waveform temporally changes in a ramp shape as a whole as the comparison voltage provided to one input terminal of the comparing unit 109. The comparing unit 109 compares the ramp wave with the pixel signal. The latch controller 107 causes the latch circuits L_0 to L_7 of the latch unit 108 to enter the enabled state (valid, active) (third timing) at the timing (first timing) at which a comparison performed by the comparing unit 109 is started. In addition, the counter 105 performs counting using the output clock CK[7] from the VCO100 as a count clock.

The comparing unit 109 compares the ramp wave provided from the ramp unit 19 with the pixel signal, and when both voltages approximately coincide (second timing) with each other, causes the comparison output to be inverted. The comparison output from the comparing unit 109 is inverted by the latch controller 107 and also a delay is added to the output, and the resultant is output as a control signal. After the comparison output from the comparing unit 109 is inverted, when the control signal from the latch controller 107 is inverted by this inversion (fourth timing), the latch circuits L_0 to L_7 of the latch unit 108 enter the disabled state (invalid, hold), and latch the logic states of the output clocks CK[0] to CK[7] output from the VCO100. At the same time, the counter 105 latches the counted value. When the predetermined period has lapsed, the controller 20 stops a supply of the control data to the ramp unit 19 and an output of the clock signal from the clock generation unit 18. Thereby, the ramp unit 19 stops generation of the ramp wave.

<Read-Out of Second Time>

After the pixel signal corresponding to the signal level output from the unit pixel 3 of an arbitrary pixel row to the vertical signal line 13 is stabilized, the controller 20 supplies data for controlling generation of the ramp wave to the ramp unit 19. After receiving the control data, the ramp unit 19 outputs the ramp wave in which the waveform temporally changes in a ramp shape as a whole, as the comparison voltage provided to one input terminal of the comparing unit 109. The comparing unit 109 compares the ramp wave with the pixel signal. The latch controller 107 causes only the latch circuit L_7 of the latch unit 108 to enter the enabled state (third timing) at a timing (first timing) at which the comparison performed by the comparing unit 109 is started. Further, the counter 105 counts the output clock CK[7] from the VCO100 as a count clock.

The comparing unit 109 compares the ramp wave provided from the ramp unit 19 with the pixel signal and when both voltages approximately coincide (second timing) with each other, causes the comparison output to be inverted. At this time, the latch controller 107 causes the latch circuits L_0 to L_6 of the latch unit 108 to enter the enabled state. The comparison output from the comparing unit 109 is inverted by the latch controller 107 and also a delay is added to the output, and the resultant is output as the control signal. After the comparison output from the comparing unit 109 is inverted, when the control signal from the latch controller 107 is inverted by this inversion (fourth timing), the latch circuits L_0 to L_7 of the latch unit 108 enter the disabled state, and latch the logic states of the output clocks CK[0] to CK[7] output from the VCO100. At the same time, the counter 105 latches the count value. When the predetermined period has lapsed, the controller 20 stops a supply of the control data to the ramp unit 19 and an output of the clock signal from the clock generation unit 18. Thereby, the ramp unit 19 stops generation of the ramp wave.

When performing the read-out of the first time and the read-out of the second time, the lower data signal corresponding to the logic states of the output clocks CK[0] to CK[7] latched by the latch unit 108 and the higher data signal corresponding to the counted value latched by the counter 105 are transferred to the output unit 17 through the horizontal signal line by the horizontal selection unit 14. The digital data of signal component is obtained by performing, by the output unit 17, the encoding process and subtraction (CDS process) based on the lower data signal and higher data signal. The output unit 17 may be built in the column processing unit 15.

Figure 2:
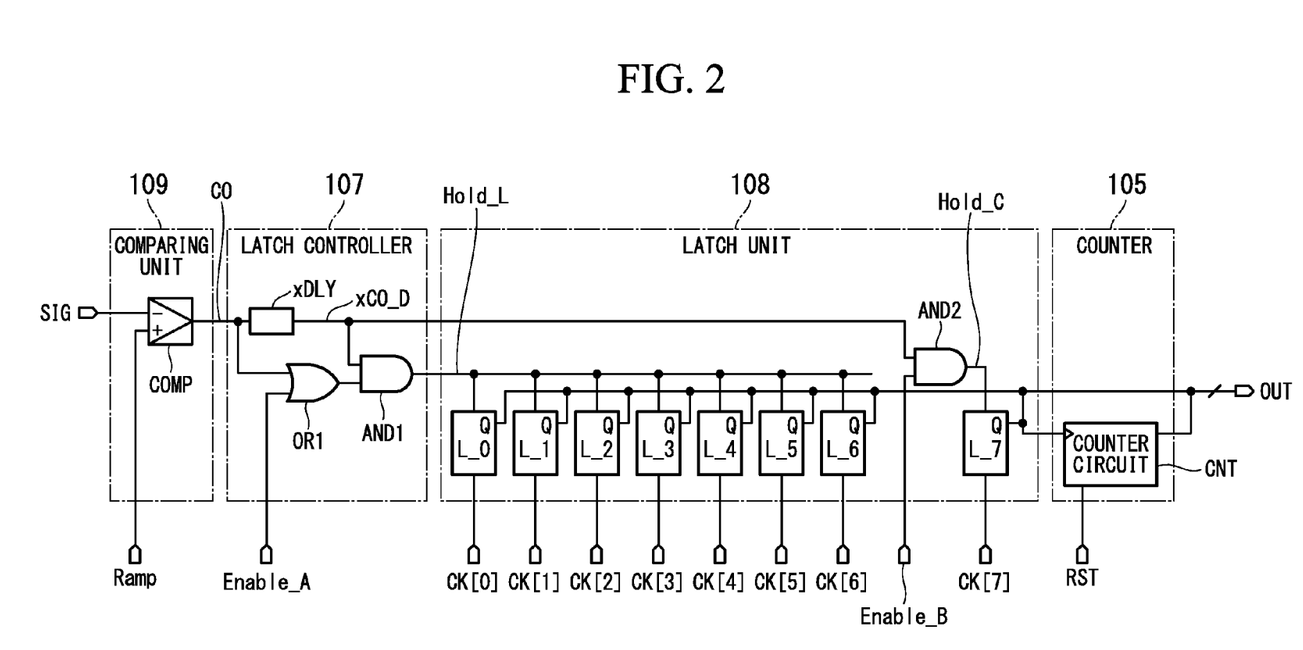
FIG. 2 is a circuit diagram illustrating a configuration of a comparing unit, a latch unit, a latch controller and a counter included in the imaging apparatus according to one embodiment of the present invention.

Next, details of the comparing unit 109, the latch unit 108, the latch controller 107 and the counter 105 will be described. FIG. 2 illustrates configurations of the latch unit 108, the latch controller 107 and the counter 105.

The comparing unit 109 has the voltage comparator COMP in which the analog signal SIG (pixel signal) which is a target of AD conversion and the ramp wave Ramp decreasing with lapse of time are input, the analog signal SIG and ramp wave Ramp are compared, and the comparison output CO based on a result of the comparison is output. The latch unit 108 has the latch circuits L_0 to L_7 which latch the logic states of the output clocks CK[0] to CK[7] from the VCO100. In addition, the latch unit 108 has the AND circuit AND2 which outputs a control signal Hold_C of a logical product (AND) of the output signal xCO_D of a inversion delay circuit xDLY which is included in the latch controller 107 and a control signal Enable_B to the latch circuit L_7. The counter 105 has the counter circuit CNT which performs counting based on the output clock CK[7] output from the latch circuit L_7. The control signal RST is a signal for performing a reset operation of the counter circuit CNT.

The latch controller 107 generates a control signal for controlling an operation of the latch unit 108. The latch controller 107 includes the inversion delay circuit xDLY, a OR circuit OR1 and a AND circuit AND1. The comparison output CO is input from the comparing unit 109 to the inversion delay circuit xDLY. The inversion delay circuit xDLY outputs output signal xCO_D obtained by inverting and delaying the comparison output CO. The comparison output CO from the comparing unit 109 and the control signal Enable_A is input to the OR circuit OR1. The OR circuit OR1 outputs the signal of a logical sum (OR) of the comparison output CO from the comparing unit 109 and the control signal Enable_A. When the control signal Enable_A is in the H state, the output signal of the OR circuit OR1 enters the H state, and when the control signal Enable_A is in an L state, the output signal of the OR circuit OR1 enters the same state as the state of the comparison output CO. The output signal xCO_D of the inversion delay circuit xDLY and the output signal of the OR circuit OR1 are input to the AND circuit AND1. The AND circuit AND1 outputs the control signal Hold_L of the logical product (AND) of the output signal xCO_D of the inversion delay circuit xDLY and the output signal of the OR circuit OR1.

Although detail will be described later, according to such a configuration, when the pixel signal corresponding to the reset level is AD-converted, the latch controller 107 causes the latch circuits L_0 to L_7 of the latch unit 108 to enter the enabled state (third timing) at a timing (first timing) relevant to comparison start in the comparing unit 109. Further, the latch controller 107 causes the latch circuits L_0 to L_7 of the latch unit 108 at a timing (fourth timing) at which the predetermined time has lapsed from the timing (second timing) at which the comparison output CO is inverted to enter the disabled state, thereby performing the latch.

In addition, the latch controller 107 causes only the latch circuit L__7 of the latch unit 108 at a timing (first timing) relevant to the comparison start in the comparing unit 109 to enter the enabled state when the pixel signal corresponding to the signal level is AD-converted. Further, the latch controller 107 causes the latch circuits L__0 to L__6 of the latch unit 108 at a timing (second timing) at which the comparison output CO is inverted to enter the enabled state, and the latch circuits L__0 to L__7 of the latch unit 108 at a timing (fourth timing) at which the predetermined time has lapsed from the timing at which the comparison output CO is inverted (second timing) to enter the disabled state, thereby performing the latch.

The latch circuits L__0 to L__6 of the latch unit 108 are in the enabled state when the control signal Hold_L from the AND circuit AND1 of the latch controller 107 is in the H state, and output the output clocks CK[0] to CK[6] from the VCO100 as is. Further, the latch circuits L__0 to L__6 enter the disabled state when the control signal Hold_L from the AND circuit AND1 of the latch controller 107 is changed from the H state to the L state, and at this time, latch the logic states corresponding to the output clocks CK[0] to CK[6] from the VCO100.

On the other hand, the latch circuit L__7 of the latch unit 108 is in the enabled state when the control signal Hold_C from the AND circuit AND2 of the latch unit 108 is in the H state, and outputs the output clock CK[7] from the VCO100 as is. Further, the latch circuit L__7 enters the disabled state when the control signal Hold_C from the AND circuit AND2 of the latch unit 108 is changed from H state to L state, and at that time, latches the logic state corresponding to the output clock CK[7] from the VCO100. This configuration is merely an example and is not limited thereto.

Figure 3:
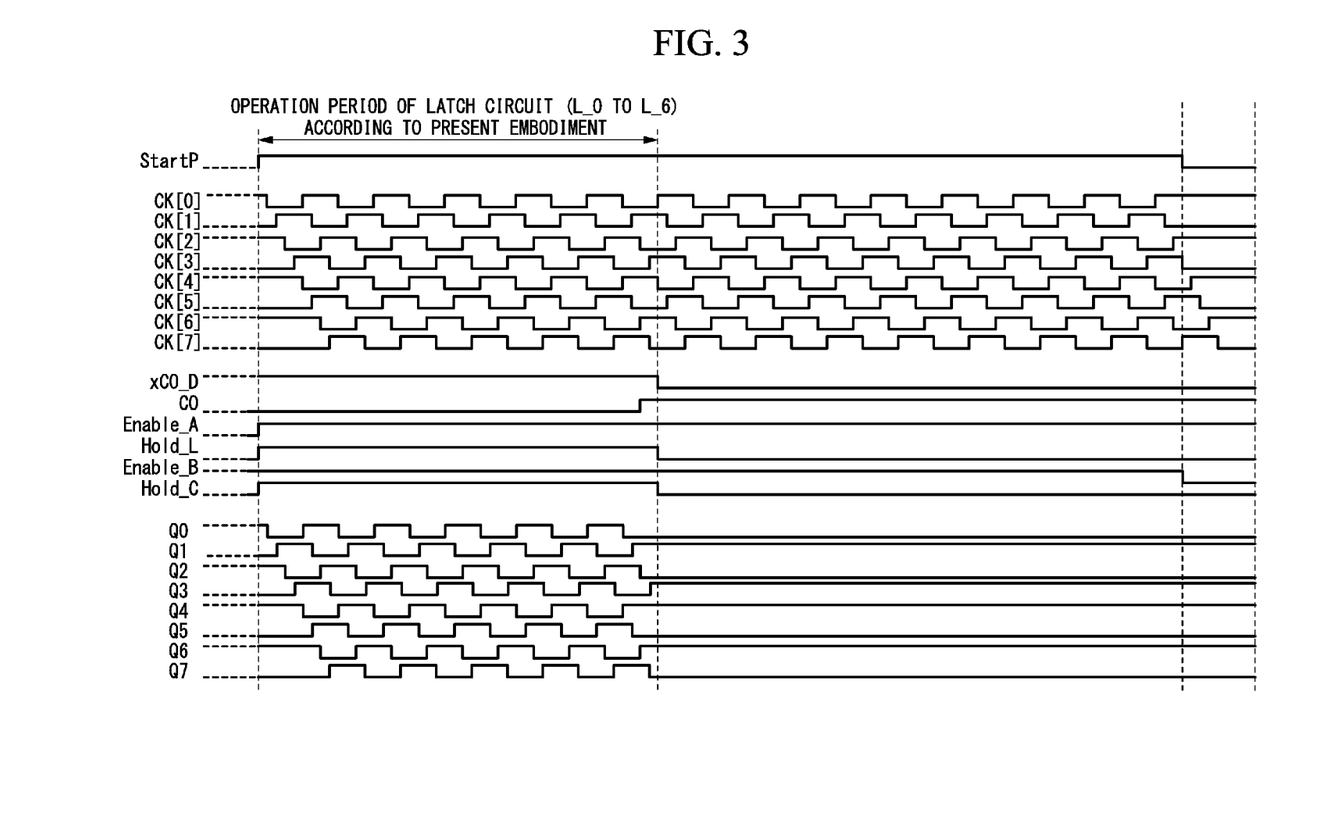
FIG. 3 is a timing chart illustrating an AD conversion operation of the imaging apparatus according to one embodiment of the present invention.

Next, a detail operation of this example will be described. FIG. 3 illustrates an AD conversion operation of the pixel signal corresponding to the reset level. In FIG. 3, Q0 to Q7 indicate signals output from the latch circuits L__0 to L__7 of the latch unit 108.

First, at the timing (first timing) relevant to the comparison start of the comparing unit 109, as a start pulse (=StartP), a clock having a period which approximately coincides with the delay time of the VCO100 is input to the VCO100. Thereby the delay units DU[0] to DU[7] of the VCO100 start their operation. The delay unit DU[0] inverts and delays the start pulse (=StartP) and outputs the start pulse as the output clock CK[0], and the delay units DU[1] to DU[7] invert and delay the output clock from the delay unit of previous stage, and output the output clock as the output clocks CK[1] to CK[7]. The output clocks CK[0] to CK[7] from the delay units DU[0] to DU[7] are input to the latch circuits L__0 to L__7 of the latch unit 108.

The comparison output CO of the comparing unit 109 is in the L state until both voltages of the pixel signal and ramp wave which are input to the comparing unit 109 approximately coincide with each other. Further, the control signal Enable_A is in the L state until the comparison in the comparing unit 109 is started, and the control signal Enable_A is in the H state at the timing (first timing) relevant to the comparison start in the comparing unit 109. Therefore, the output signal of the OR circuit OR1 changes from the L state to the H state at the timing (first timing) relevant to the comparison start in the comparing unit 109. Further, during the comparison output CO of the comparing unit 109 is in the L state, the output signal xCO_D of the inversion delay circuit xDLY is in the H state.

The output signal xCD_D of the inversion delay circuit xDLY is in the H state at the timing (first timing) relevant to the comparison start in the comparing unit 109 and the output signal of the OR circuit OR1 changes from the L state to the H state, thereby changing the control signal Hold_L of the AND circuit AND1 from the L state to the H state. Therefore, the latch circuits L__0 to L__6 are in the enabled state (third timing)

On the other hand, since the control signal Enable_B is in the H state at the timing (first timing) relevant to the comparison start in the comparing unit 109 and the output signal xCD_D of the inversion delay circuit xDLY is in the H state, the control signal Hold_C of the AND circuit AND2 is in the H state. Therefore, the latch circuit L__7 is in the enabled state, and outputs the output clock CK[7] from the delay unit DU[7] as is. The counter 105 performs counting based on the output clock CK[7]. In this counting operation, the counted value is increased or decreased using rising or falling of the output clock CK[7].

Subsequently, the comparison output CO of the comparing unit 109 is inverted at a timing (second timing) at which both voltages of the pixel signal and ramp wave which are input to the comparing unit 109 approximately coincide with each other. Further, the output signal xCO_D of the inversion delay circuit xDLY changes from the H state to the L state at a timing (fourth timing) at which the predetermined time has lapsed from the timing at which the comparison output CO of the comparing unit 109 is inverted. Thereby, since the control signal Hold_L of the AND circuit AND1 and the control signal Hold_C of the AND circuit AND2 changes from the H state to the L state, the latch circuits L__0 to L__7 enter the disabled state, and latch the logic states corresponding to the output clocks CK[0] to CK[7] from the VCO100. The counter 105 latches the counted value by stopping the operation of the latch circuit L__7.

Data corresponding to the pixel signal is obtained by the logic state latched by the latch unit 108 and the counted value latched by the counter 105. The latched data is output to the output unit 17 of the latter stage to perform the process of the encoding and the like.

As described above, when the pixel signal corresponding to the reset level is AD-converted, the latch circuits L__0 to L__7 enter the enabled state at the timing (first timing) relevant to the comparison start in the comparing unit 109. Since the reset level of the pixel is approximately the same in all columns of the pixels, the comparison outputs CO of the comparing units 109 in the column AD conversion unit 16 of all columns are inverted at approximately the same time. As a result, the latch circuits L__0 to L__7 of the column AD conversion unit 16 of all columns enter the enabled state at approximately the same time, and due to a transient current flowing in the latch circuits L__0 to L__7, there is a case in which a transient bounce overlaps a power voltage and a ground voltage in the column AD conversion unit 16 near a center column of the column processing unit 15 as described above. However, since the transient bounce is sufficiently stabilized at a timing (fourth timing) at which the latch circuits L__0 to L__7 enter the disabled state, it is possible to reduce deterioration of AD conversion accuracy.

In the above operation, the timing (third timing) at which the latch circuits L__0 to L__6 are in the enabled state is the same timing as the timing (first timing) relevant to the comparison start in the comparing unit 109, but may be another timing. The timing (third timing) at which the latch circuits L__0 to L__6 enter the enabled state is included in a period from the timing (first timing) relevant to the comparison start in the comparing unit 109 to the timing (second timing) at which the comparison output CO of the comparing unit 109 is inverted, and may be a timing earlier than the second timing. By changing the timing that the control signal Enable_A changes from the L state to the H state, it is possible to change the timing (third timing) at which the latch circuits L__0 to L__6 enter the enabled state.

As the timing (third timing) at which the latch circuits L__0 to L__6 enter the enabled state is close to the timing (second timing) at which the comparison output CO of the comparing unit 109 is inverted, the period from the timing at which the latch circuits L__0 to L__6 enter the enabled state to the timing at which latch circuits L__0 to L__6 enter the disabled state is shortened. However, in the present embodiment, since the latch circuits L__0 to L__6 enter the enabled state at the timing which is earlier than the second timing, when compared with the related art in which the latch circuits L__0 to L__6 enter the enabled state at the second timing, since the period from the timing at which the latch circuits L__0 to L__6 enter the enabled state and to the timing at which the latch circuits L__0 to L__6 enter the disabled state is more longer, and therefore it is possible to further reduce an influence on the transient bounce at the timing at which the latch circuits L__0 to L__6 enter the disabled state and the latch is performed.

Figure 4:
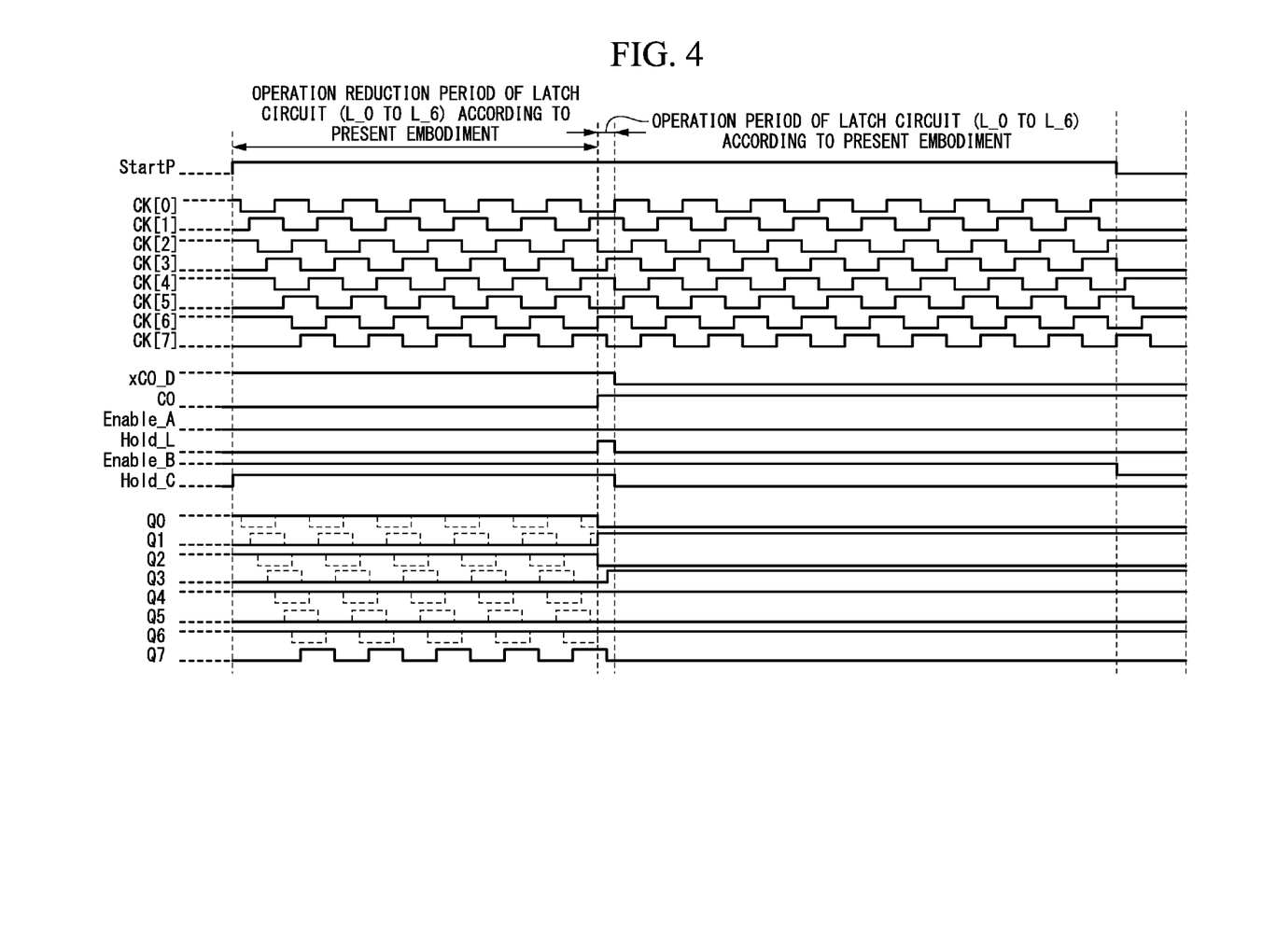
FIG. 4 is a timing chart illustrating the AD conversion operation of the imaging apparatus according to one embodiment of the present invention.

FIG. 4 illustrates an AD conversion operation of the pixel signal corresponding to the signal level. In FIG. 4, Q0 to Q7 indicate signals output from the latch circuits L__0 to L__7 of the latch unit 108. When performing the AD conversion on the pixel signal corresponding to the signal level, the control signal Enable_A is in the L state at all times.

First, at the timing (first timing) relevant to the comparison start in the comparing unit 109, as a start pulse (=StartP), a clock having a period which approximately coincides with the delay time of the VCO100 is input to the VCO100. Thereby, the delay units DU[0] to DU[7] of the VCO100 start their operation. The delay unit DU[0] inverts and delays the start pulse (=StartP) and outputs the start pulse as the output clock CK[0], and the delay units DU[1] to DU[7] invert and delay the output clock from the delay unit of the previous stage and output the output clock as the output clocks CK[1] to CK[7]. The output clocks CK[0] to CK[7] from the delay units DU[0] to DU[7] are input to the latch circuits L__0 to L__7 of the latch unit 108.

The comparison output CO of the comparing unit 109 is in the L state until both voltages of the pixel signal and the ramp wave which are input to the comparing unit 109 approximately coincide with each other. Further, since the control signal Enable_A is in the L state, the output signal of the OR circuit OR1 is in the L state. Further, during the comparison output CO of the comparing unit 109 is in the L state, the output signal xCO_D of the inversion delay circuit xDLY is in the H state. Since the output signal xCO_D of the inversion delay circuit xDLY is in the H state and the output signal of the OR circuit OR1 is in the L state, the control signal Hold_L of the AND circuit AND1 is in the L state. For this reason, the latch circuits L__0 to L__6 are in the disabled state.

On the other hand, since the control signal Enable_B is in the H state at the timing (first timing) relevant to the comparison start in the comparing unit 109 and the output signal xCO_D of the inversion delay circuit xDLY is in the H state, the control signal Hold_C of the AND circuit AND2 is in the H state. For this reason, the latch circuit L__7 is in the enabled state, and outputs the output clock CK[7] from the delay unit DU[7] as is. The counter 105 performs counting based on the output clock CK[7]. In the counting operation, the counted value is increased or decreased using rising or descending of the output clock CK[7].

Subsequently, the comparison output CO of the comparing unit 109 is inverted at a timing (second timing) at which both voltages of the pixel signal and the ramp wave which are input to the comparing unit 109 approximately coincide with each other. Thereby, the output signal of the OR circuit OR1 changes from the L state to the H state. Since the output signal xCO_D of the inversion delay circuit xDLY is in the H state, and the output signal of the OR circuit OR1 changes from the L state to the H state, the control signal Hold_L of the AND circuit AND1 changes from the L state to the H state. Thereby, the latch circuits L__0 to L__6 enter the enabled state.

Furthermore, the output signal xCO_D of the inversion delay circuit xDLY changes from the H state to the L state at a timing (fourth timing) at which the predetermined time has lapsed from a timing at which the comparison output CO of the comparing unit 109 is inverted. Thereby, since the control signal Hold_L of the AND circuit AND1 and the control signal Hold_C of the AND circuit AND2 change from the H state to the L state, the latch circuits L__0 to L__7 enter the disabled state, and latch the logic states corresponding to the output clocks CK[0] to CK[7] from the VCO100. The counter 105 latches the counted value by causing operation of the latch circuit L__7 to stop.

By the logic state latched by the latch unit 108 and the counted value latched by the counter 105, data corresponding to the pixel signal is obtained. The latched data is output to the output unit 17 of the latter stage, and the process such as the encoding is performed.

As described above, when performing the AD conversion on the pixel signal corresponding to the signal level, the latch circuits L__0 to L__6 enter the enabled state at the timing (second timing) relevant to comparison end in the comparing unit 109 and enter the disabled state at a timing (fourth timing) at which a predetermined time has lapsed from the second timing. As described above, since the latch circuits L__0 to L__6 operate only in the period from the second timing to the fourth timing, it is possible to reduce the current consumed by the latch unit 108.

Since there are many cases in which the signal level is different for each unit pixel 3, when performing the AD conversion on the pixel signal corresponding to the signal level, there are many ways in which the timing at which the comparison ends in the comparing unit 109, that is, the timing at which the latch circuits L__0 to L__6 enter the enabled state, is different in the column AD conversion unit 16 of each column in many cases. For this reason, as the latch circuits L__0 to L__6 of the column AD conversion unit 16 of each column enter the enabled state at a different timing, since the transient current flowing in the latch circuits L__0 to L__6 flows to temporally distribute, the transient bounce which overlaps the power voltage and ground voltage is reduced. Therefore, the degradation of AD conversion accuracy is less likely to occur.

In this example, by controlling the operations of the latch circuits L__0 to L__6, the low power consumption is realized. However, for example, by controlling the operations of the latch circuits L__0 to L__5, the low power consumption may be realized. In addition, there is no need to be limited to this.

As described above, according to the present embodiment, when performing the AD conversion on the pixel signal corresponding to the reset level, even when the transient bounce overlaps the power source voltage or ground voltage, it is possible to further reduce the influence on the transient bounce at the timing to cause the latch unit 108 to perform the latch. Thereby, it is possible to reduce deterioration of AD conversion accuracy, and to obtain a higher quality of image. Further, when performing the AD conversion on the pixel signal corresponding to the signal level, it is possible to reduce the current consumption in the latch unit 108.

While preferred embodiments of the invention have been described and illustrated above, it should be understood that these are exemplary of the invention and are not to be considered as being limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An imaging apparatus, comprising:
    an imaging unit in which a plurality of pixels having a photoelectric conversion element are arranged, the imaging unit outputting a first pixel signal corresponding to a reset level and a second pixel signal corresponding to an amount of an incident electromagnetic wave; and
    an AD conversion circuit configured to perform an AD conversion on the first pixel signal and the second pixel signal,
    wherein the AD conversion circuit includes:
        a reference signal generation unit configured to generate a reference signal which increases or decreases with lapse of time;
        a comparing unit configured to start a comparison process of the pixel signal and the reference signal at a first timing for inputting the pixel signal that is a target of AD conversion, the comparing unit ending the comparison process at a second timing at which the reference signal satisfies a predetermined condition for the pixel signal;
        a clock generation unit which has a delay circuit configured by connecting a plurality of delay units, the clock generation unit outputting a clock signal from each of the delay units;
        a latch unit configured to latch a logic state of the clock signal output from the clock generation unit;
        a counter configured to perform a counting based on the clock signal output from the clock generation unit; and
        a latch controller configured to cause the latch unit to be valid at a third timing before the second timing and to cause the latch unit to execute a latching at a fourth timing when the first pixel signal is AD-converted, the third timing being included in a period from the first timing to the second timing, the fourth timing being a timing when a predetermined time has lapsed from the second timing, the latch controller causing the latch unit to be valid at the second timing and causing the latch unit to execute the latching at the fourth timing when the second pixel signal is AD-converted.

2. The imaging apparatus according to claim 1, wherein the comparing unit, the latch unit, the counter and the latch controller are provided in each column or a plurality of columns of an arrangement of the pixels of the imaging unit.

* * * * *